United States Patent
Smith (10) Patent No.: US 9,215,205 B1
(45) Date of Patent: Dec. 15, 2015

(54) HARDWARE ACCELERATOR FOR A DOMAIN NAME SERVER CACHE

(75) Inventor: Les Smith, Pleasanton, CA (US)

(73) Assignee: Infoblox Inc., Santa Clara, CA (US)

( * ) Notice: Subject to any disclaimer, the term of this patent is extended or adjusted under 35 U.S.C. 154(b) by 161 days.

(21) Appl. No.: 13/452,547

(22) Filed: Apr. 20, 2012

(51) Int. Cl.
  *G06F 15/16* (2006.01)
  *H04L 29/12* (2006.01)

(52) U.S. Cl.
  CPC ...... *H04L 61/1511* (2013.01); *H04L 29/12066* (2013.01)

(58) Field of Classification Search
  USPC ......... 709/224, 225, 229, 213, 245; 714/47.1, 714/48
  See application file for complete search history.

(56) References Cited

U.S. PATENT DOCUMENTS

| | | | | |
|---|---|---|---|---|
| 7,792,994 B1 * | 9/2010 | Hernacki | | 709/245 |
| 8,103,915 B2 * | 1/2012 | Xu | | 714/43 |
| 2002/0107954 A1 * | 8/2002 | Ferguson et al. | | 709/224 |
| 2003/0058274 A1 * | 3/2003 | Hill et al. | | 345/751 |
| 2007/0239938 A1 * | 10/2007 | Pong | | 711/122 |
| 2008/0028463 A1 * | 1/2008 | Dagon et al. | | 726/22 |
| 2009/0327487 A1 * | 12/2009 | Olson et al. | | 709/224 |
| 2010/0146415 A1 * | 6/2010 | Lepeska | | 715/760 |
| 2010/0332680 A1 * | 12/2010 | Anderson et al. | | 709/245 |
| 2012/0084382 A1 * | 4/2012 | Robinson | | 709/213 |
| 2012/0124239 A1 * | 5/2012 | Shribman et al. | | 709/245 |
| 2012/0254939 A1 * | 10/2012 | Lum et al. | | 726/1 |
| 2012/0284505 A1 * | 11/2012 | Smith et al. | | 713/151 |
| 2012/0303808 A1 * | 11/2012 | Xie | | 709/225 |
| 2013/0262697 A1 * | 10/2013 | Karasaridis et al. | | 709/242 |
| 2014/0082172 A1 * | 3/2014 | Chueh et al. | | 709/223 |
| 2014/0173034 A1 * | 6/2014 | Liu et al. | | 709/217 |

* cited by examiner

*Primary Examiner* — Abdullahi E Salad
(74) *Attorney, Agent, or Firm* — Van Pelt, Yi & James LLP (57) ABSTRACT

Techniques for a hardware accelerator for a domain name server (DNS) cache are disclosed. In some embodiments, a hardware accelerator for a DNS cache includes: executing a packet processing engine of a host device to identify a DNS request; and performing a DNS lookup in the DNS cache. In some embodiments, a hardware accelerator for a DNS cache includes: determining if a time to live (TTL) parameter associated with a first entry stored in the DNS cache is below a threshold value; and if the TTL parameter associated with the first entry stored in the DNS cache is below the threshold value, then performing a pre-fetch operation to update the first entry in the DNS cache, wherein the updated entry comprises an updated TTL value.

11 Claims, 10 Drawing Sheets

HARDWARE ACCELERATOR FOR A DOMAIN NAME SERVER CACHE

BACKGROUND OF THE INVENTION

A domain name server (DNS) lookup is when a device that supports Internet Protocol (IP) queries a DNS server for an IP address associated with that domain name (e.g., www.domain-name.com). DNS appliances and servers exist for responding to such DNS queries.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A domain name server (DNS) lookup is when a device that supports Internet Protocol (IP) queries a DNS server for an IP address associated with that domain name (e.g., www.domain-name.com). DNS appliances and servers exist for responding to such DNS queries.

However, what is needed are improved techniques for handling DNS lookup queries.

Accordingly, various techniques for a hardware accelerator for a domain name server (DNS) cache are disclosed. In some embodiments, a hardware accelerator for a DNS cache includes executing a packet processing engine of a host device to identify a DNS request, and performing a DNS lookup in the DNS cache.

In some embodiments, a hardware accelerator for a DNS cache includes determining if a time to live (TTL) parameter associated with a first entry stored in the DNS cache is below a threshold value; and if the TTL parameter associated with the first entry stored in the DNS cache is below the threshold value, then performing a pre-fetch operation to update the first entry in the DNS cache, wherein the updated entry comprises an updated TTL value.

For example, using various techniques described herein for a hardware accelerator for a DNS cache can significantly increase DNS caching performance. In particular, using various techniques described herein can result in improved DNS query processing performance (e.g., greater than one million DNS queries using a 70% cache hit ratio and assuming a mix of standard 'A,' 'AAAA,' and 'PTR' type DNS queries).

In some embodiments, a hardware accelerator for a domain name server (DNS) server request including a DNS cache is implemented as a customized network interface card that includes a high performance programmable packet processing engine. In some embodiments, a hardware accelerator for a domain name server (DNS) server request including a DNS cache provides a high performance DNS cache application leveraging the packet processing engine to accelerate DNS query processing. In some embodiments, in addition to DNS acceleration, various techniques described herein can also provide TCP offload and/or denial of service (DOS) and distributed DOS (DDOS) filtering. In some embodiments, the network interface card can be provided as a primary network interface card (NIC) for a network computing device (e.g., host, such as a server or network appliance).

These and various other techniques for using a hardware accelerator for a domain name server (DNS) cache are described herein with respect to various embodiments as further described below.

Figure 1:
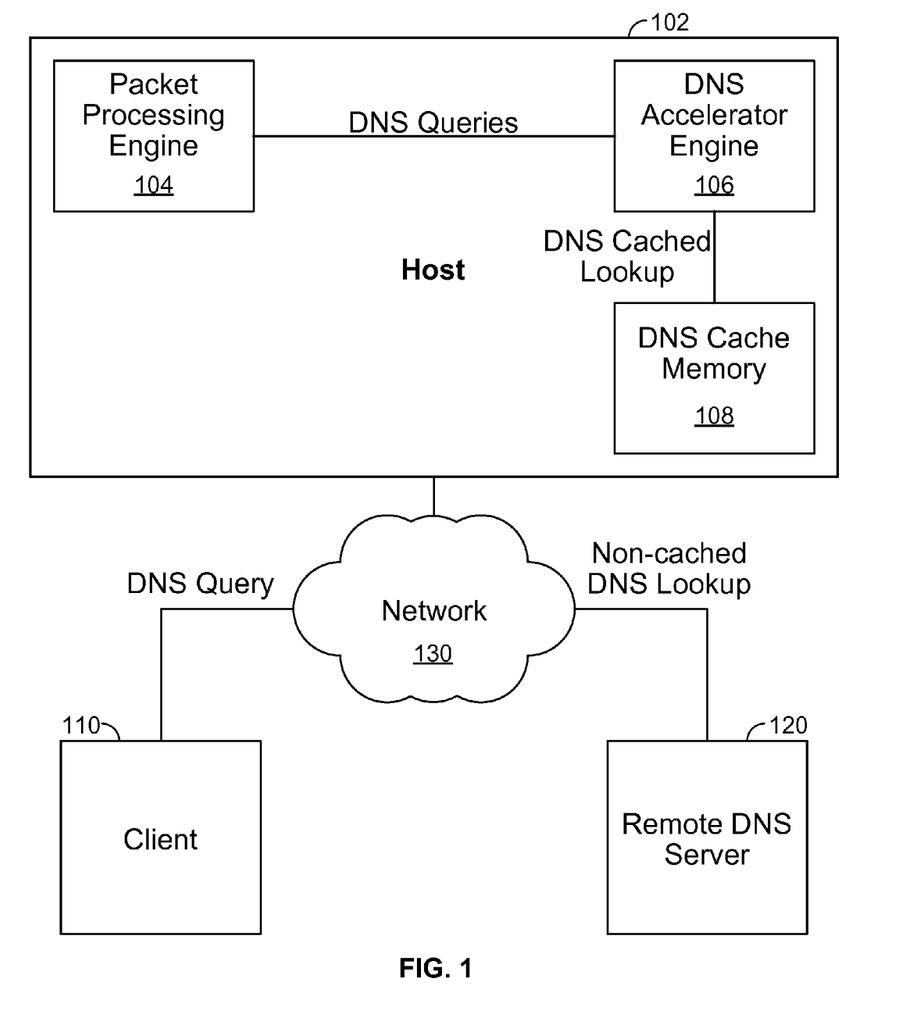
FIG. 1 is a functional block diagram illustrating a hardware accelerator for a domain name server (DNS) server request in accordance with some embodiments.

FIG. 1 is a functional block diagram illustrating a hardware accelerator for a domain name server (DNS) server request in accordance with some embodiments. As shown, a client 110 can send a DNS query via a network 130 (e.g., the Internet or a local area network (LAN)) to a host 102 (e.g., a server or network appliance). For example, if a user browsing on the client device requests to visit a web site (e.g., www.yahoo.com or www.google.com or some other web site) for which the client does not have a locally cached IP address, then a DNS query is used to determine an IP address for the requested web site domain (e.g., web site). The host 102 includes a hardware accelerator for DNS requests. In particular, the host 102 includes a packet processing engine 104. The packet processing engine 104 filters network traffic received for the host 102 to efficiently identify DNS requests (e.g., DNS queries). The packet processing engine 104 then can send such DNS requests to a DNS accelerator engine 106. The DNS accelerator engine 106 performs a DNS cached lookup to determine if the DNS request has been cached in the DNS cache memory 108. If the DNS request matches a cached entry in the DNS cache memory 108, then the cached entry in the DNS cache memory 108 can be used to respond to the DNS request from the client 110.

Otherwise (i.e., the DNS request does not match a cached entry in the DNS cache memory 108), a non-cached DNS lookup can be performed using the DNS server 112 on the host 102. For example, the DNS server 112 can perform a DNS lookup over the network 130 to a DNS server 120 as shown. In some embodiments, the DNS response from the DNS server 112/120 is trapped by the packet processing engine 104, and the response is added as a new DNS entry in the DNS cache memory 108. As a result, a subsequent request for the same web site domain can then use the DNS cached entry for a more efficient DNS query response from the host 102. In some embodiments, the DNS accelerator engine 106 is implemented as a function of the packet processing engine 104.

In some embodiments, the packet processing engine 104 is implemented using a specialized packet processing processor. For example, commercially available hardware solutions for packet processing can be configured and programmed to use such techniques, such as from Cavium (e.g., the Cavium OCTEON), Net Logic, Freescale, or other commercially available packet processing engines. Such commercially available solutions for packet processors typically include a classifier and hardware assisted packet inspection. The classifier and hardware packet inspection functions can be used for highly scalable packet processing and inspection. The packets received at a network interface (e.g., network interface card (NIC)) are sniffed and then can be processed (e.g., analyzed for identification using various inspection and classification techniques for different types of protocols and/or packet contents). In some embodiments, the packet processing engine 104 is configured to process incoming packets and to identify DNS queries. The identified DNS queries can then be processed locally using the packet processing engine, such as described herein. For example, the DNS query can be inspected to determine if the DNS query matches a cached entry in the DNS cache (e.g., a cache hit indicates that the desired response to the DNS query is present in the DNS accelerator cache, such as DNS cache memory 108). If not, the DNS query can then be forwarded to a DNS server (e.g., DNS server 120) for normal DNS query processing. Also, as similarly described above, on the return of that DNS query processing, the DNS query response can be trapped and cached in the DNS accelerator cache. For example, a DNS request for www.google.com or www.yahoo.com can be intercepted by the packet processing engine, looked up for a cache hit in the DNS accelerator cache, and if present, then the packet processing engine sends the DNS response using the cached entry in the DNS accelerator cache. Otherwise, the DNS query can be sent to a DNS server for a non-cached DNS lookup, and the response from the DNS server can be cached in the DNS accelerator cache to improve future performance using the packet processing engine and DNS accelerator cache.

In some embodiments, DNS accelerator engine 106 also performs various background activities to maintain the DNS cache memory. For example, these background activities can include periodically removing old cached entries using various techniques and algorithms as described herein. In some embodiments, the packet processing engine 104 and/or DNS accelerator engine 106 periodically reviews cached DNS entries in the DNS cache memory 108 to identify cached DNS entries that are about to time-out, such as based on the TTL (time to live) parameter associated with the cached DNS entry. For such DNS query time-outs in the hardware accelerator DNS cache, a pre-fetch operation is performed prior to a TTL time-out to preemptively maintain a current DNS cache hit for that DNS query. For example, if a previously cached DNS query for www.google.com or www.yahoo.com has a TTL that is about to expire (e.g., if TTL<x) in a cache entry, then a pre-fetch DNS query is performed for that web site domain to refresh that DNS cached entry.

For example, using such a pre-fetch DNS query technique can provide significant performance improvements for the hardware accelerate DNS cache to avoid cache misses for subsequent DNS requests matching previously cached DNS queries. The DNS query can return a same or different IP address but the TTL will be updated. In some embodiments, a least frequently used (LFU) algorithm is implemented (e.g., to flush based on LFUs and about to expire TTL entries to clear space in the DNS cache, which can have for example thousands of entries, such as 2,000 or more entries).

In some embodiments, the packet processing engine 104 can also perform other filtering, such as on the front-end packet processing for received packets. For example, the packet processing engine can perform certain types of security filtering, such as DOS/DDOS filtering (e.g., such filters can include filtering of ICMP flood, SYN flood, UDP flood, or other DOS/DDOS types of attacks).

In some embodiments, the packet processing engine 104 can apply various other security filtering. For example, the packet processing engine 104 can determine whether the source address of the DNS query is on a blacklist. As another example, the packet processing engine 104 can determine whether the source address of the DNS query is blocked by a global access control list (ACL). These and various other types of security filtering techniques can be performed using the packet processing engine 104 as will now be apparent to those of ordinary skill in the art in view of the various embodiments described herein.

In some embodiments, access control list (ACL) processing is implemented using the packet processing engine. For example, all incoming DNS queries can be checked against an IP address-based ACLs to determine if the query should be allowed or not. In some embodiments, by default, all incoming DNS queries are processed. Individual or a range of IP addresses can be saved in an ACL list. For example, all DNS queries can be processed to have their source IP address checked against the ACL. The ACL includes IP addresses that are not allowed to perform DNS lookups. If such IP addresses are detected in the DNS query, the DNS packet is simply dropped and no further processing takes place. If the packet passes the ACL check, then it will be passed on for further processing by the cache part of the firmware. For example, ACL filtering can be implemented by a Radix tree in a very similar manor to Bind. Access control lists (ACLs) can be used, for example, to determine which hosts are not allowed to query the host (e.g., host 102).

In some embodiments, on the back end, the packet processing engine 104 can also perform other filtering, such as TCP and UDP offloading engine operations. In some embodiments, all incoming packets are inspected by the packet processing engine to determine if the packets are UDP packets or not. Non-UDP packets are passed on to the TOE and its stack for normal processing. UDP packets are further examined to determine if they are DNS related or not. Non-DNS related packets are passed on to the TCP/IP Offload Engine (TOE) untouched. DNS packets are intercepted for processing by the caching firmware as described herein.

Figure 2:
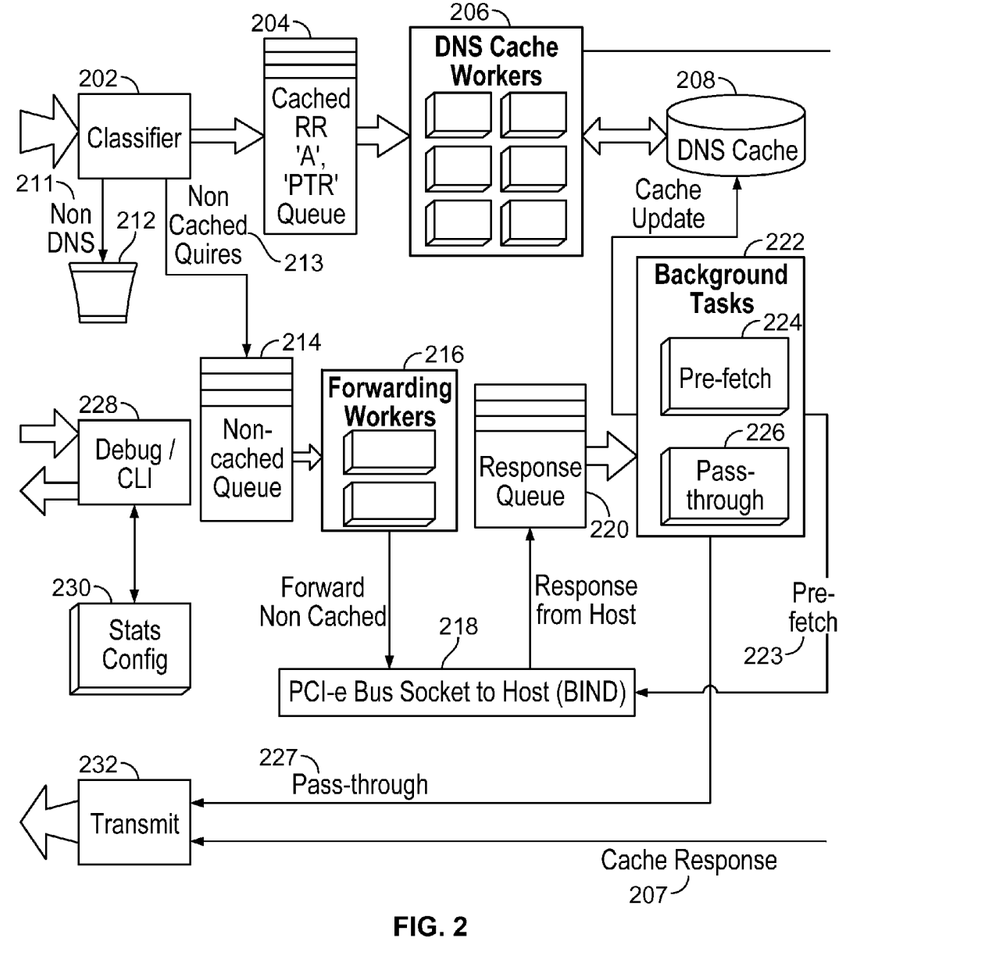
FIG. 2 is a functional block diagram illustrating a hardware accelerator for a domain name server (DNS) server request including a DNS cache in accordance with some embodiments.

FIG. 2 is a functional block diagram illustrating a hardware accelerator for a domain name server (DNS) server request including a DNS cache in accordance with some embodiments. In particular, FIG. 2 shows an overall structure of a software architecture; configuration and programming of the classifier allows 5 tuple and DOS/DDOS filtering to happen at hardware speed, allowing very high throughput of network traffic to be routed for local processing or pass through for normal host processing. In some embodiments, a commercially available packet processing hardware, such as Cavium OCTEON, Net Logic, or any generic packet processing hardware that allows custom software to be executed on the network interface card is included.

Referring to FIG. 2, a classifier 202 is provided. In some embodiments, the classifier 202 is a hardware assisted packet inspection element that can be configured to perform a fast lookup of network packets (e.g., to identify DNS queries). A cached RR queue 204 provides a work queue that is used to feed the DNS cache workers 206. For example, when a DNS query is detected by the classifier 202, the network packet is stored in the cached RR queue 204 for further processing. The DNS cache workers 206 provides a pool of processes that are responsible for answering the DNS query, each process is responsible for decoding the DNS question, performing a lookup in the DNS cache table and formatting the response. If the DNS cache workers 206 does not find the corresponding entry in the DNS cache, then the DNS cache workers 206 is responsible for forwarding the question to the non-cached queue 214. As also shown, if the classifier at 202 receives non-cached DNS queries 213, then such non-cached DNS queries are sent to the non-cached queue 214. The non-cached queue 214 is used to hold network packets that will be forwarded to the host for further processing.

The DNS cache 208 is a highly optimized in memory cache. In some embodiments, the DNS cache 208 stores each DNS name and resource records in a hash table. For example, hardware assisted hashing algorithms can be utilized to quickly find DNS resource records.

Forwarding workers 216 provides a pool of processes that monitor and track network packets that are sent to or received from the host. They are responsible for mapping the IP layer between the DNS cache and the host. The forwarding workers 216 maintain a mapping table of forward DNS requests allowing returned DNS responses from the host to be mapped to the original DNS request by background tasks and a response queue 220. The response queue 220 holds the network requests that originate from the host. These requests can be forwarded directly to the transmit interface by the pass-through functionality or can be consumed by the pre-fetch functionality.

In some embodiments, various background tasks 222 are performed. For example, a pre-fetch process can be performed as a background task. The pre-fetch process (224/223) is a process that monitors the TTL values in the DNS cache 208 and automatically updates the entry when the TTL value is about to expire (e.g., exceeds a threshold value). In some embodiments, the pre-fetch process also performs an algorithm that maintains heuristics regarding the access patterns of the entries, in which the algorithm expires least frequently used entries to optimize performance. As another example, a pass through process can also be performed as a background task. The pass through process (226/227) is a process that is responsible for transparently handling all other network packets, which are not used by the DNS cache. In some embodiments, the transmit functionality 232 is used to accelerate the creation of the IP packet (e.g., DNS query cache response 207) as it is put on the wire.

Referring to FIG. 2, all the packets enter the NIC through the packet classifier and are then placed in a packet memory pool. In some embodiments, classification rules and various filters are applied, after the hardware has completed certain basis sanity checks on the packets, and a descriptor (e.g., or work queue element (WQE)) to the memory region that contains the packet is placed in the WQE pool (e.g., which can be split based on workload or other configurations). Once a descriptor is placed in the WQE pool, the next available processor core fetches the descriptor from the pool and evaluates the contents of the packet the WQE is pointing to. If the packet is not a DNS request, DOS and DDOS analysis and TCP offload functionality is performed before the packet is sent over the PCI-e interface 218 to the host. If the packet is malformed or is flagged as a DOS or DDOS packet, then the packet is dropped and stats 230 will be updated appropriately. Also, if non-DNS packets are received at the classifier 202, then the non-DNS packets (211) are discarded as shown at 212. As also shown, a debug/CLI (Command Line Interface) 228 is also provided for debugging the network interface shown in FIG. 2.

In some embodiments, if the packet is a DNS query, then after DOS/DDOS evaluation, the DNS query section of the DNS request is evaluated and a lookup in the local DNS cache 208 is performed. If ACL or DNS views are present, then the DNS query is first checked against the ACL list. If the DNS query is not allowed, then no response will be returned and no further processing will be performed. If the DNS query is not blocked by ACL, then the DNS query can be subject to further filtering (e.g., if one or more additional DNS query filtering rules exist). After filtering, the DNS query is passed to the lookup function. If the name/IP for the DNS query is found, then the answer section will be filled in and the descriptor will be passed to the transmit functionality 232 to respond to the requester with the answer. If the local DNS cache 208 does not contain the response, then the DNS query will be passed to the host to allow the DNS server on the host to answer the query. When the host answers a query, the reply packet will be intercepted before it is sent out over the wire. An entry in the DNS cache 208 is created and the question and answer data is filled in. Once complete, the packet is released and can be sent out over the wire.

In some embodiments, the local DNS cache 208 includes an array of fixed size data buffers. Each buffer is large enough to contain any UDP packet with a DNS reply. The cache buffers are aligned in physical memory to match core cache line sizes for maximum load/store performance. An array of "cache buckets" provides a management interface for the cache buffers. These cache buckets contain pointers to the physical cache buffers as well as a small amount of extracted DNS data to aid during lookups. The cache buckets are then managed by a third access layer called the hash array. The hash array is an array of access control data as well as a hash key that applies to a specific cache bucket. To determine if a question has been cached, a hash is performed on the question text string. This hash value is then used as an index to the cache bucket array. If the entry in the cache bucket array is marked as used then there is a high likelihood the reply can be found in cache and a lookup attempt will start. Because all cores are running identical copies of firmware, it is necessary to serialize accesses to cache buffers to avoid corruption if one core is modifying a cache buffer at the same time another core is reading the same buffer. Access semaphores, or spin-locks, are placed in the hash array entries to allow for such protection. For example, accesses to cache buckets can be carefully serialized in a way to reduce the performance impact as much as possible.

In some embodiments, the various techniques described herein can be implemented using a packet processing engine configured either using pipeline processing (e.g., each core runs a custom code fragment and is specialized to perform a specific task, such as DNS lookup, DOS and DDOS filtering, TCP offload and pass through, and/or background services such as TTL refresh, cache LFU/LRU management, etc.) or per core processing (e.g., all cores run the same code fragment(s) and can perform all of the specific tasks, such as described herein). For example, an LRU replacement algorithm can be implemented. The hit frequency of the cache entries will be tracked. When a cache buffer needs to be freed up it will be one with a low hit frequency.

Figure 3A:
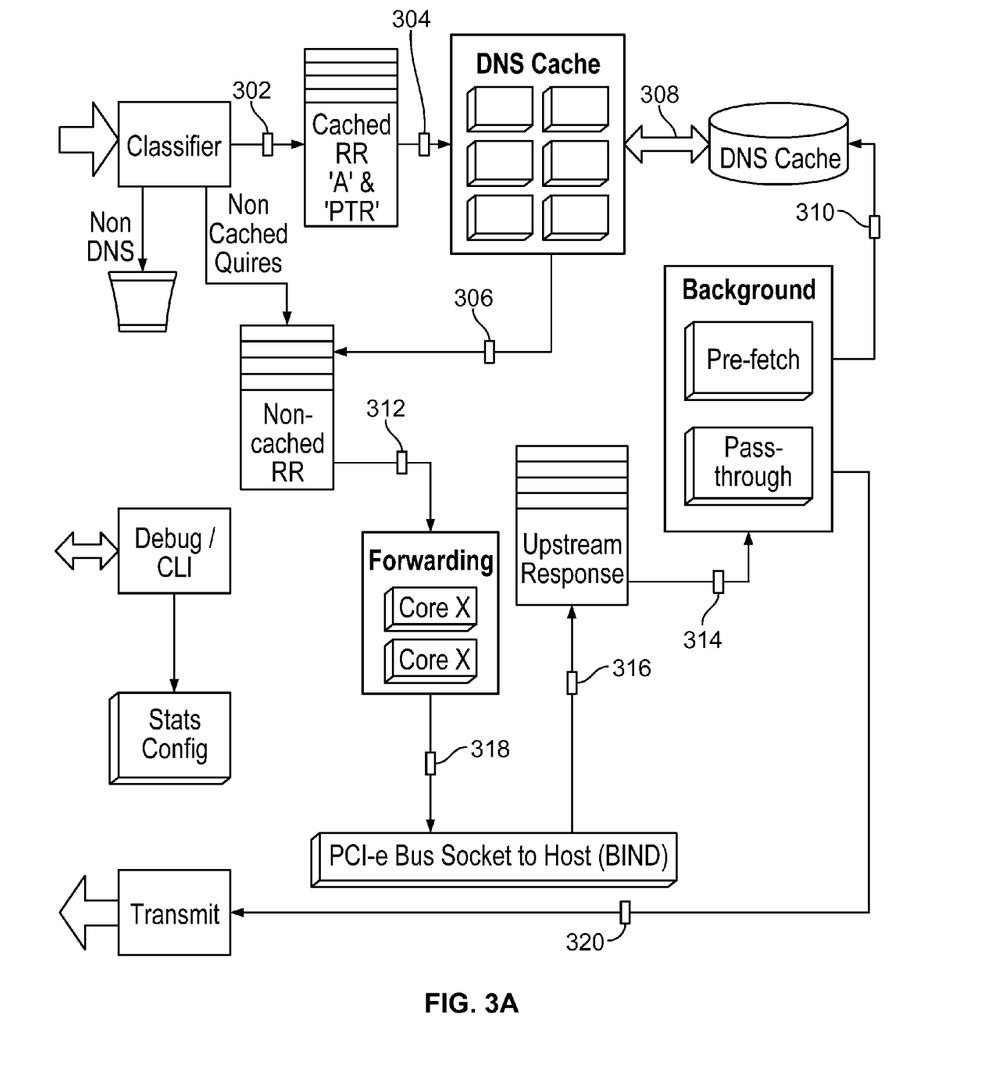
FIG. 3A is another functional block diagram illustrating a hardware accelerator for a domain name server (DNS) server request in operation for when a DNS entry is not in the DNS cache in accordance with some embodiments.

FIG. 3A is another functional block diagram illustrating a hardware accelerator for a domain name server (DNS) server request in operation for when a DNS entry is not in the DNS cache in accordance with some embodiments. For example, at startup and/or at other times, a given DNS request may not be present as a DNS entry in a local DNS cache (e.g., a DNS request for www.google.com) that enters the classifier. At 302, the classifier looks at the packet, determines that it is a DNS query, and passes the DNS query to an input queue. At 304, one of the worker cores takes the request for further processing. The worker generates a hash on the DNS query and performs a lookup at 306. At 308, the worker does not find a matching cached entry, so the DNS query is passed to a cache miss queue. One of the forwarding workers sends the request to the host for a DNS query processing using the DNS server on the host at 310 and 312. Upstream Bind responds with an answer at 314. At 316, one of the background workers takes the request. At 318, the background worker forwards the response to the requester (e.g., transmits the DNS query response). At 320, the background worker updates the DNS cache if needed.

Figure 3B:
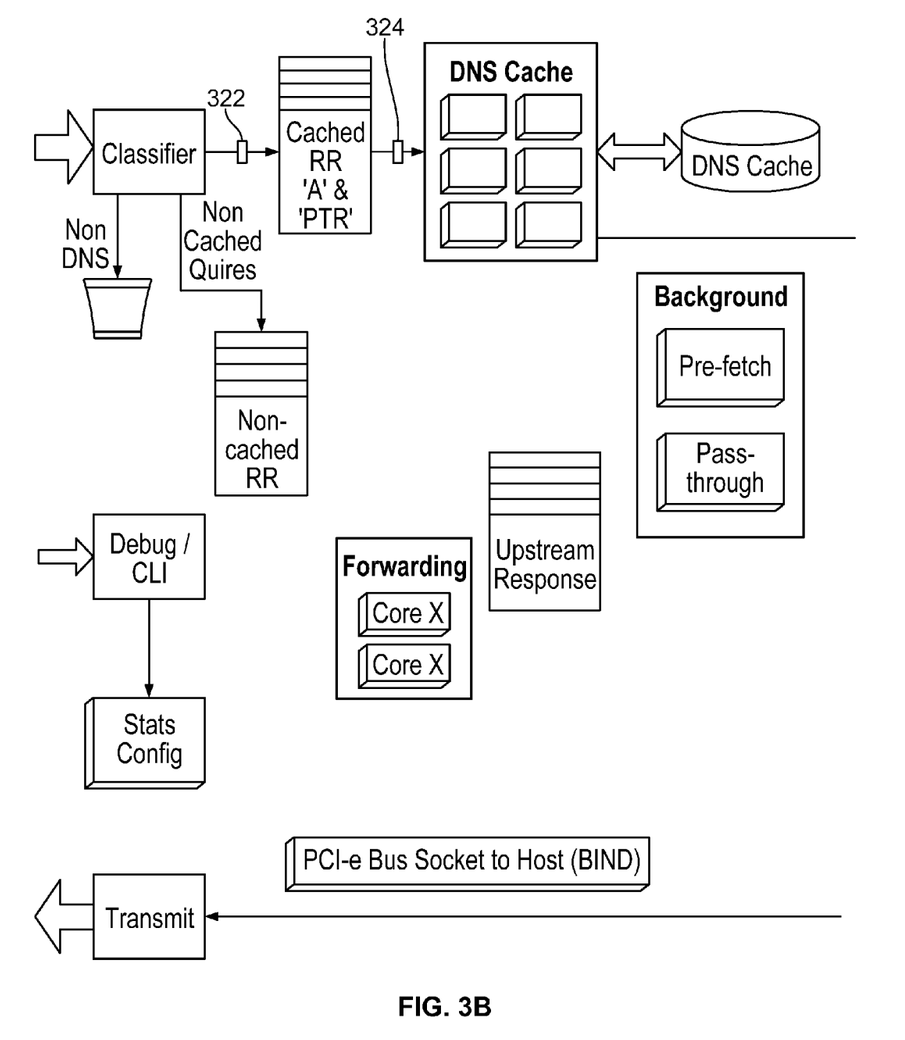
FIG. 3B is another functional block diagram illustrating a hardware accelerator for a domain name server (DNS) server request in operation for a cached lookup when a DNS entry is present in the DNS cache in accordance with some embodiments.

FIG. 3B is another functional block diagram illustrating a hardware accelerator for a domain name server (DNS) server request in operation for a cached lookup when a DNS entry is present in the DNS cache in accordance with some embodiments. For example, a DNS request for www.google.com enters the classifier. At 322, the classifier looks at the packet, determines that it is a DNS query, and passes the DNS query to an input queue. At 324, one of the worker cores takes the request for further processing. At 326, the worker generates a hash and performs a DNS cache lookup. At 328, the worker finds a matching cached entry and responds to the DNS query (e.g., transmits the DNS query response).

Figure 3C:
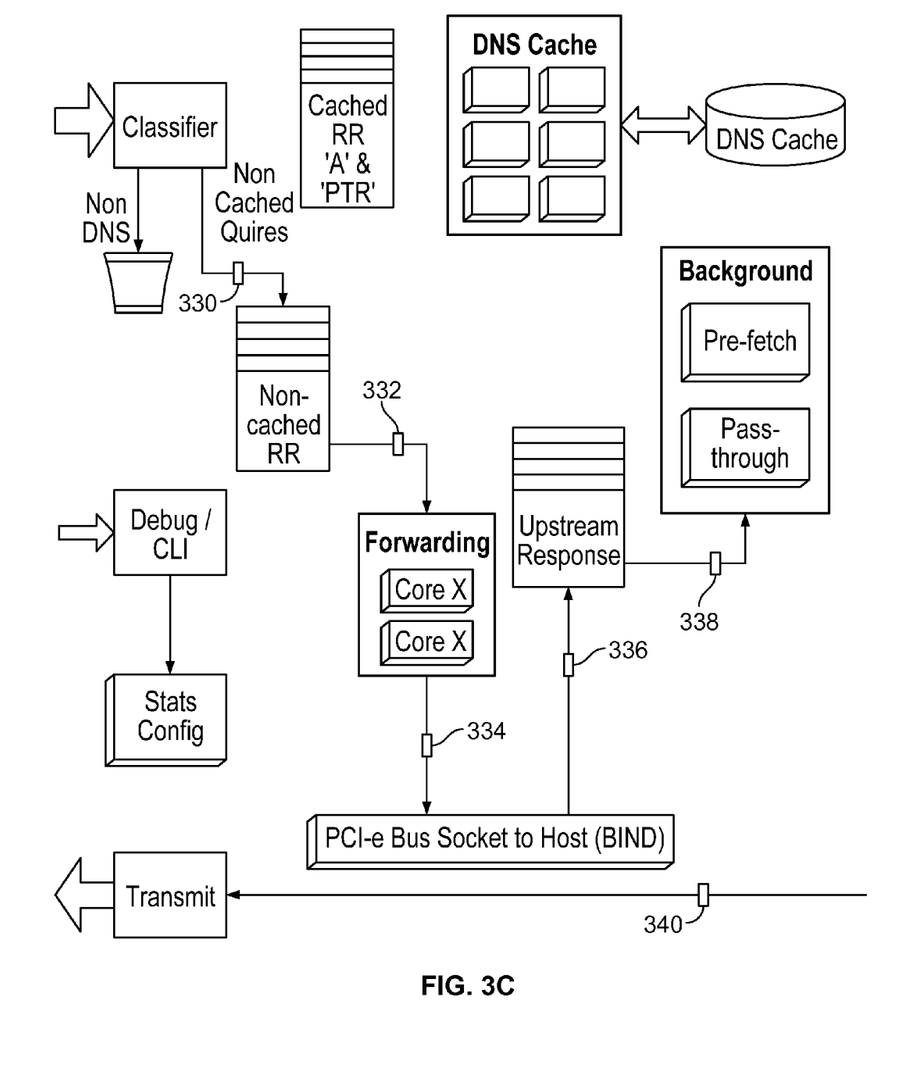
FIG. 3C is another functional block diagram illustrating a hardware accelerator for a domain name server (DNS) server request in operation for a non-cached DNS lookup in accordance with some embodiments.

FIG. 3C is another functional block diagram illustrating a hardware accelerator for a domain name server (DNS) server request in operation for a non-cached DNS lookup in accordance with some embodiments. For example, a DNS request (e.g., DNS query) enters the classifier. At 330, the classifier looks at the packet, determines that it is a DNS request for MX record, and passes the DNS query to the non-cached queue. At 332/334, one of the forwarding workers sends the request to the host. At 336, upstream BIND responds with an answer. At 338, one of the background workers takes the request. At 340, the background worker forwards the response to the requester (e.g., transmits the DNS query response).

Figure 3D:
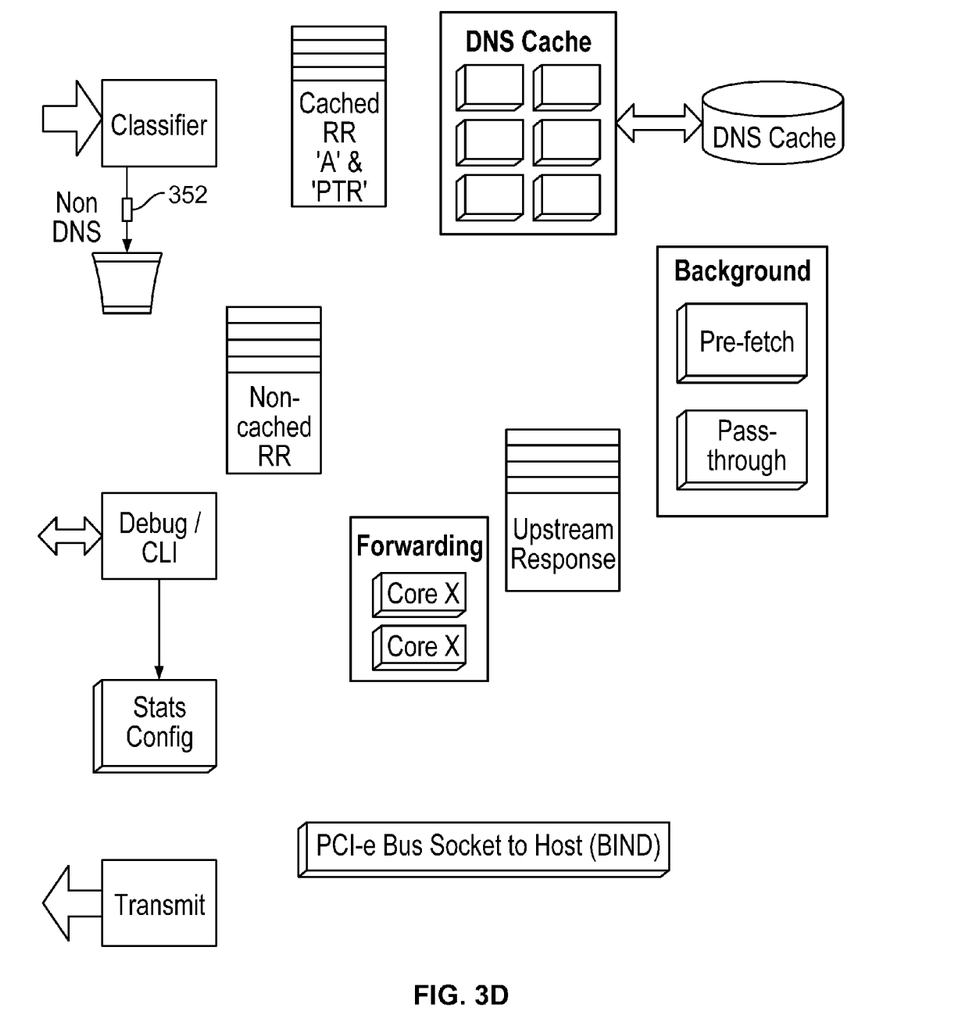
FIG. 3D is another functional block diagram illustrating a hardware accelerator for a domain name server (DNS) server request in operation for non-DNS packets in accordance with some embodiments.

FIG. 3D is another functional block diagram illustrating a hardware accelerator for a domain name server (DNS) server request in operation for non-DNS packets in accordance with some embodiments. At 352, a non-DNS packet is received at the classifier, and the non-DNS packet is discarded by the classifier.

Figure 3E:
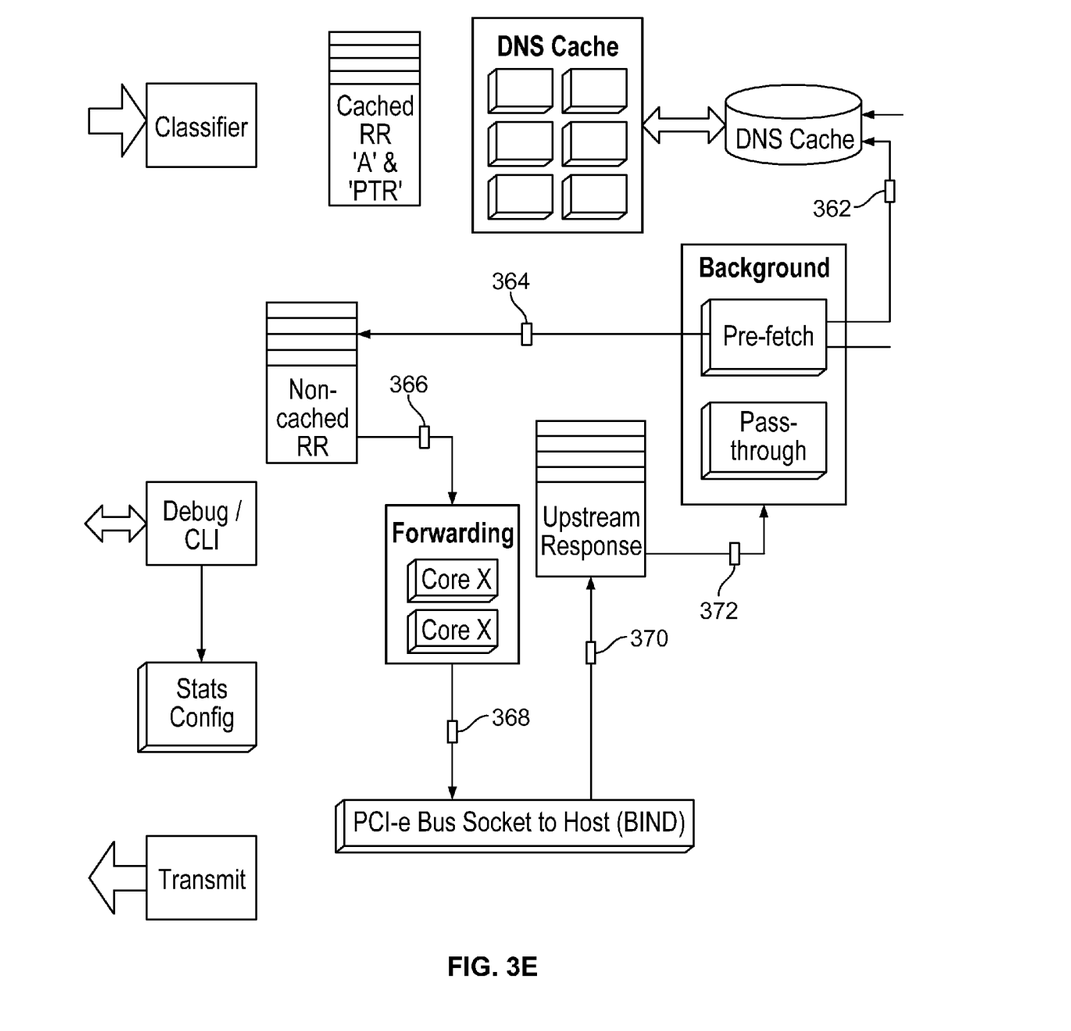
FIG. 3E is another functional block diagram illustrating a hardware accelerator for a domain name server (DNS) server request in operation for refreshing DNS entries in the DNS cache based on TTL parameter tasks in accordance with some embodiments.

FIG. 3E is another functional block diagram illustrating a hardware accelerator for a domain name server (DNS) server request in operation for refreshing DNS entries in the DNS cache based on TTL parameter tasks in accordance with some embodiments. At 362, a background task scans TTL entries for values that exceed a threshold (e.g., <5 seconds or some other threshold value(s)). At 364, the background task generates a new DNS lookup (e.g., for entries that do not exceed the threshold value(s)). At 366/368, one of the forwarding workers sends the request to the host. At 370, upstream BIND responds with the answer. At 372, one of the background workers takes the request. At 374, the background worker updates the DNS cache.

In some embodiments, tracking of TTL counters is performed using a background process. For example, this TTL process can be activated periodically (e.g., at a rate of once per second or at some other interval or event trigger(s)). At activation, the TTL process inspects a sorted list of TTL entries to determine if any TTL value has reached its update threshold time. For entries that have reached this threshold, the TTL process generates an internal DNS query for the soon to be expired entry. This DNS query is sent to BIND for normal processing. At that point, the TTL background processing is completed, and the process returns to its sleep state.

In some embodiments, when a DNS reply is inserted into the DNS cache memory, its various answer TTL values are inspected. For example, the answer with the lowest TTL value found can be used as the overall TTL value for this cache entry. As a result, it will only be required to track this single TTL value and use it to determine when to refresh the entire entry. In some embodiments, this TTL value is inserted into an external sorted list of TTLs. This list is sorted so that the shortest TTL is at the head of the list and the longest at the tail. The system time of insertion is also recorded and stored in this list. The TTL update background process will use this list to determine if and when a TTL is close to expiring so a background update can take place.

In some embodiments, a check of all TTL values is performed before storing the DNS cache entries in the DNS cache (e.g., memory). For example, a TTL value can be verified to not be lower than a user defined TTL-min time with a default (e.g., 10 seconds or some other minimum default value). Any response with a TTL value less than this threshold will not be cached. The reason for this is that because of the large amount of cache buckets, it could be possible that a larger percentage of replies come in with a very short TTL time. This would then result in an overload on the cache refresh logic since these entries would have to be refreshed too frequently and therefore consume too much bandwidth and the result would be a denial-of-service type condition. An upper maximum TTL value can also be user defined (e.g., such as a default of 24 hours or some other maximum value setting). Any response with a TTL value greater than this level can have its TTL value trimmed down to the maximum.

Figure 4:
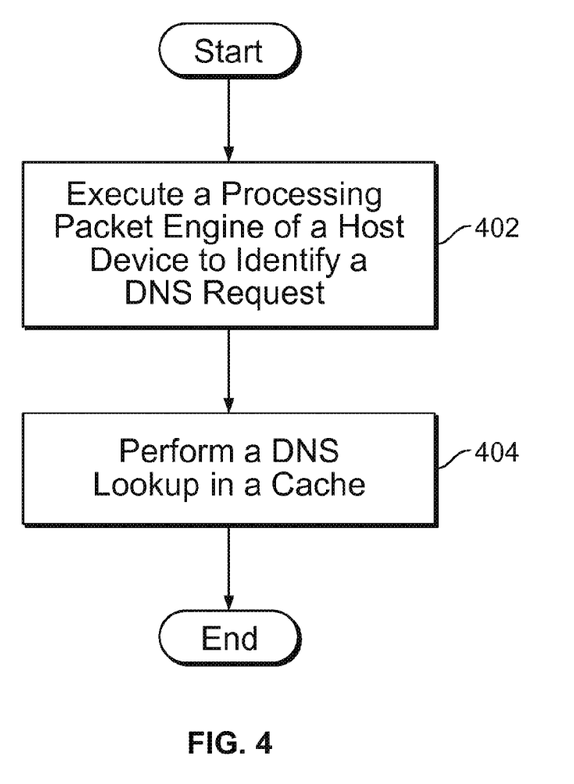
FIG. 4 is a flow chart illustrating a hardware accelerator for a domain name server (DNS) server request for a cached lookup when a DNS entry is present in the DNS cache in accordance with some embodiments.

FIG. 4 is a flow chart illustrating a hardware accelerator for a domain name server (DNS) server request for a cached lookup when a DNS entry is present in the DNS cache in accordance with some embodiments. At 402, a packet processing engine of a host device is executed to identify a DNS request. At 404, a DNS lookup in a cache is performed.

Figure 5:
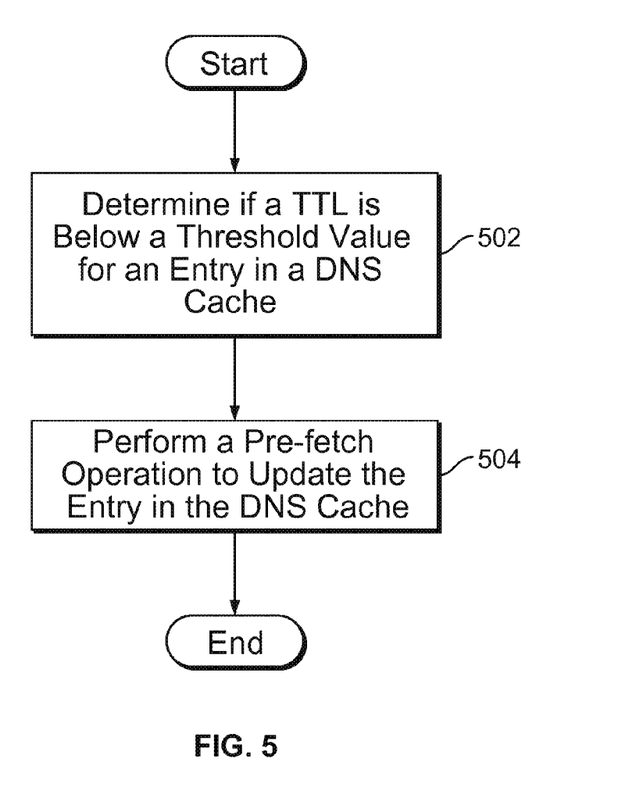
FIG. 5 is a flow chart illustrating a hardware accelerator for a domain name server (DNS) server request for refreshing DNS entries in the DNS cache based on TTL parameter tasks in accordance with some embodiments.

FIG. 5 is a flow chart illustrating a hardware accelerator for a domain name server (DNS) server request for refreshing DNS entries in the DNS cache based on TTL parameter tasks in accordance with some embodiments. At 502, whether a TTL is below a threshold value for an entry in a DNS cache is determined. At 504, a pre-fetch operation to update the entry in the DNS cache is performed.

Figure 6:
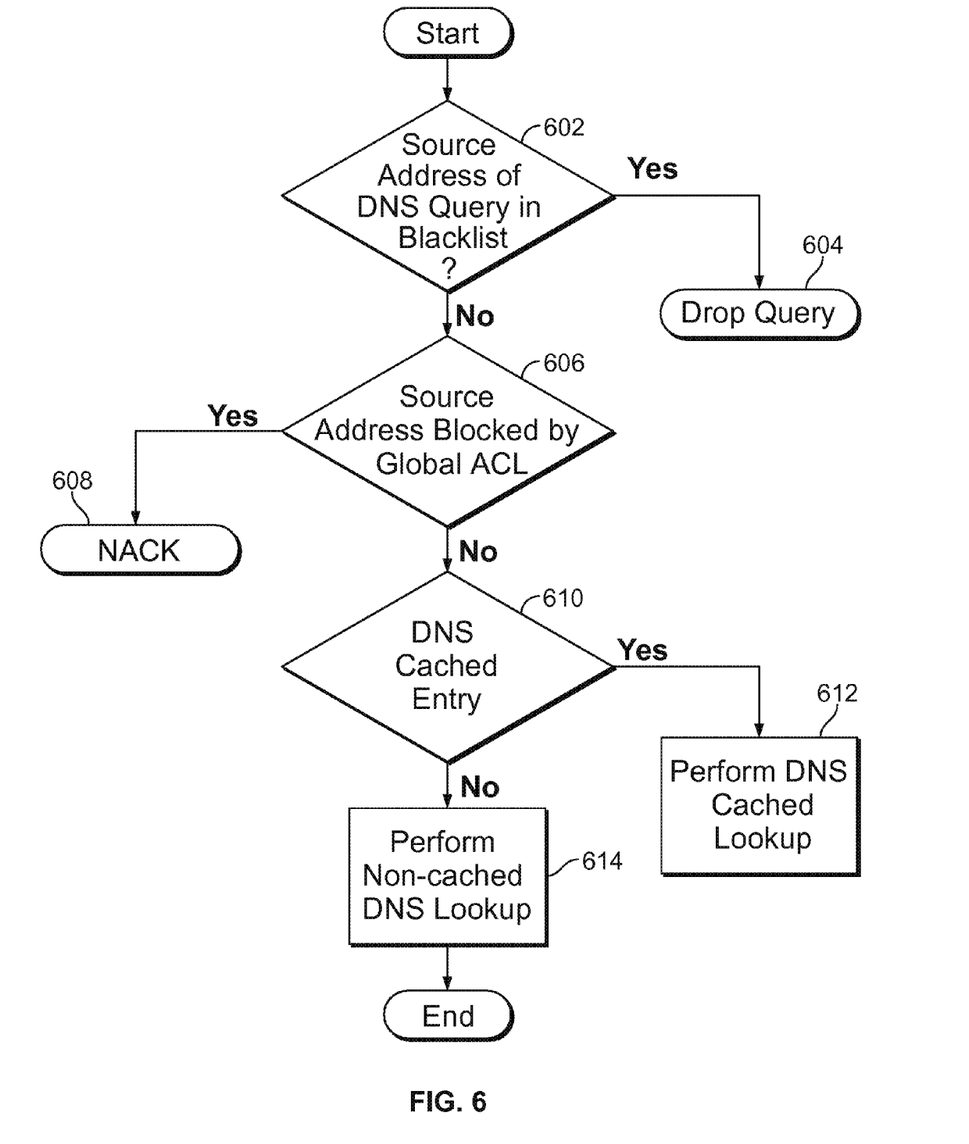
FIG. 6 is a flow chart illustrating a hardware accelerator for a domain name server (DNS) server request for refreshing DNS entries in the DNS cache including access control list (ACL) and packet classification operations in accordance with some embodiments.

FIG. 6 is a flow chart illustrating a hardware accelerator for a domain name server (DNS) server request for refreshing DNS entries in the DNS cache including access control list (ACL) and packet classification operations in accordance with some embodiments. At 602, whether a source address of a DNS query in a blacklist is determined. If so, the DNS query is dropped at 604. Otherwise, at 606, whether the source address is blocked by a global ACL is determined. If so, then a no acknowledgement (NACK) response is generated at 608. Otherwise, at 610, whether the DNS query matches a DNS cached entry is determined. For example, various hashing or other techniques can be used to perform an efficient cache hit determination. If there is a DNS cache hit, then a DNS cached lookup is performed at 612. Otherwise, a non-cached DNS lookup is performed at 614. In some embodiments, the non-cached DNS lookup is trapped and cached in the DNS cache.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a hardware accelerator for a domain name server (DNS) lookup, comprising:
a domain name server (DNS) cache;
a processor configured to:
store a plurality of entries in the DNS cache, comprising:
receive a DNS reply including an entry to be stored;
determine whether a time to live (TTL) parameter of the received entry is less than a second threshold value, the second threshold value being greater than 0;
in the event that the TTL parameter of the received entry is less than the second threshold value, omit storing the received entry in the DNS cache;
determine whether the time to live (TTL) parameter of the received entry is greater than a third threshold value, the third threshold value being greater than or equal to each of a first threshold value and the second threshold value; and
in the event that the TTL parameter of the received entry is greater than the third threshold value:
reduce the TTL parameter of the received entry to correspond to the third threshold value; and
store the received entry with the reduced TTL parameter;
periodically perform a pre-fetch process on the plurality of entries stored in the DNS cache, wherein the performing of the pre-fetch process comprises:
for each of the plurality of entries, determine whether a TTL parameter associated with a corresponding entry stored in the DNS cache is below the first threshold value;
in the event that the TTL parameter associated with the corresponding entry stored in the DNS cache is below the first threshold value, mark the corresponding entry; and
for each marked entry, update the each marked entry in the DNS cache, wherein the updated entry comprises an updated TTL value and an updated Internet Protocol (IP) address;
execute a packet processing engine of a host device to identify a DNS request; and
perform a DNS lookup in the DNS cache, wherein the performing of the pre-fetch process is separate from the performing of the DNS lookup; and
perform cache management on the DNS cache, comprising to:
determine whether an entry in the DNS cache satisfies a least frequently used (LFU) algorithm; and
in the event that the entry satisfies the LFU algorithm, remove the entry from the DNS cache, wherein a TTL of each entry in the DNS cache is less than or equal to the third threshold value; and
a memory coupled to the processor and configured to provide the processor with instructions.

2. The system recited in claim 1, wherein the system is implemented on a network interface card.

3. The system recited in claim 1, wherein the processor is further configured to: apply a security filter to a DNS query.

4. The system recited in claim 1, wherein the processor is further configured to: determine if a DNS query matches an access control list (ACL).

5. The system recited in claim 1, wherein the processor is further configured to: determine if a DNS query matches a black list entry.

6. The system recited in claim 1, wherein the processor is further configured to: perform cache management on the DNS cache.

7. The system recited in claim 1, wherein the processor is further configured to: perform cache management on the DNS cache using a least recently used (replacement) algorithm.

8. A method for a hardware accelerator for a domain name server (DNS) cache, comprising:
storing a plurality of entries in the DNS cache, comprising:
receiving a DNS reply including an entry to be stored;
determining whether a time to live (TTL) parameter of the received entry is less than a second threshold value, the second threshold value being greater than 0;
in the event that the TTL parameter of the received entry is less than the second threshold value, omitting storing the received entry in the DNS cache;
determining whether the time to live (TTL) parameter of the received entry is greater than a third threshold value, the third threshold value being greater than or equal to each of a first threshold value and the second threshold value; and
in the event that the TTL parameter of the received entry is greater than the third threshold value:

reducing the TTL parameter of the received entry to correspond to the third threshold value; and storing the received entry with the reduced TTL parameter;

periodically performing a pre-fetch process on the plurality of entries stored in the DNS cache, wherein the performing of the pre-fetch process comprises:

for each of the plurality of entries, determining whether a TTL parameter associated with a corresponding entry stored in the DNS cache is below the first threshold value;

in the event that the TTL parameter associated with the corresponding entry stored in the DNS cache is below the first threshold value, marking the corresponding entry; and for each marked entry, updating the each marked entry in the DNS cache, wherein the updated entry comprises an updated TTL value and an updated Internet Protocol (IP) address;

executing a packet processing engine of a host device to identify a DNS request; and performing a DNS lookup in the DNS cache, wherein the performing of the pre-fetch process is separate from the performing of the DNS lookup; and performing cache management on the DNS cache, comprising:

determining whether an entry in the DNS cache satisfies a least frequently used (LFU) algorithm; and in the event that the entry satisfies the LFU algorithm, removing the entry from the DNS cache, wherein a TTL of each entry in the DNS cache is less than or equal to the third threshold value.

9. The method of claim 8, wherein the DNS cache is implemented on a network interface card.

10. The method of claim 8, further comprising:

applying a security filter to a DNS query.

11. A computer program product for a hardware accelerator for a domain name server (DNS) cache, the computer program product being embodied in a tangible non-transitory computer readable storage medium and comprising computer instructions for:

storing a plurality of entries in the DNS cache, comprising:

receiving a DNS reply including an entry to be stored;

determining whether a time to live (TTL) parameter of the received entry is less than a second threshold value, the second threshold value being greater than 0;

in the event that the TTL parameter of the received entry is less than the second threshold value, omitting storing the received entry in the DNS cache;

determining whether the time to live (TTL) parameter of the received entry is greater than a third threshold value, the third threshold value being greater than or equal to each of a first threshold value and the second threshold value; and in the event that the TTL parameter of the received entry is greater than the third threshold value:

reducing the TTL parameter of the received entry to correspond to the third threshold value; and storing the received entry with the reduced TTL parameter;

periodically performing a pre-fetch process on the plurality of entries stored in the DNS cache, wherein the performing of the pre-fetch process comprises:

for each of the plurality of entries, determining whether a TTL parameter associated with a corresponding entry stored in the DNS cache is below the first threshold value;

in the event that the TTL parameter associated with the corresponding entry stored in the DNS cache is below the first threshold value, marking the corresponding entry; and for each marked entry, updating the each marked entry in the DNS cache, wherein the updated entry comprises an updated TTL value and an updated Internet Protocol (IP) address;

executing a packet processing engine of a host device to identify a DNS request; and performing a DNS lookup in the DNS cache, wherein the performing of the pre-fetch process is separate from the performing of the DNS lookup; and performing cache management on the DNS cache, comprising:

determining whether an entry in the DNS cache satisfies a least frequently used (LFU) algorithm; and in the event that the entry satisfies the LFU algorithm, removing the entry from the DNS cache, wherein a TTL of each entry in the DNS cache is less than or equal to the third threshold value.

* * * * *